United States Patent [19]

Niebylski

[11] Patent Number: 5,045,399

[45] Date of Patent: Sep. 3, 1991

[54] ORGANOBOROSILAZANE POLYMERS

[75] Inventor: Leonard M. Niebylski, Baton Rouge, La.

[73] Assignee: Ethyl Corporation, Richmond, Va.

[21] Appl. No.: 242,493

[22] Filed: Sep. 9, 1988

Related U.S. Application Data

[63] Continuation-in-part of Ser. No. 147,183, Jan. 22, 1988, abandoned.

[51] Int. Cl.[5] .................... B32B 18/00; C08G 77/56; C08G 79/08
[52] U.S. Cl. ...................................... 428/447; 501/92; 524/104; 524/533; 524/857; 528/4; 528/5; 528/8; 528/25; 528/27; 528/33; 528/38; 556/402; 556/403; 428/408; 428/704
[58] Field of Search ............... 528/4, 5, 8, 25, 27, 528/33, 38; 501/92; 524/104, 533, 857; 556/402, 403; 428/447

[56] References Cited

U.S. PATENT DOCUMENTS

| 3,519,671 | 7/1970 | Markovitz | 556/402 |
| 4,152,509 | 5/1979 | Yajima et al. | 528/4 |
| 4,228,270 | 10/1980 | Kobayashi | 528/8 |
| 4,267,210 | 5/1981 | Yajima et al. | 427/226 |
| 4,361,679 | 11/1982 | Yajima et al. | 525/389 |
| 4,397,828 | 8/1983 | Seyferth et al. | 423/344 |
| 4,482,669 | 11/1984 | Seyferth et al. | 524/442 |
| 4,482,689 | 11/1984 | Haluska | 528/25 |
| 4,645,807 | 2/1987 | Seyferth et al. | 525/474 |
| 4,650,837 | 3/1987 | Seyferth et al. | 525/478 |
| 4,659,850 | 4/1987 | Arai et al. | 556/409 |
| 4,731,437 | 3/1988 | Taniguchi et al. | 528/394 |
| 4,767,728 | 8/1988 | Riccitiello | 501/91 |

FOREIGN PATENT DOCUMENTS 0278734  8/1988  European Pat. Off. ............ 556/403

Primary Examiner—Richard D. Lovering
Attorney, Agent, or Firm—Patricia J. Hogan

[57] ABSTRACT

Preceramic polymers which have particular utility in providing protective ceramic coatings on carbon/carbon composites, graphite, carbon fibers, and other normally oxidizable materials are prepared by reacting about 0.25-20 parts by weight of a trialkyl- or trialkoxyboroxine in which the alkyl or alkoxy groups contain 1-6 carbons with one part by weight of a poly-silazane to form an organoborosilazane polymer.

30 Claims, No Drawings

ORGANOBOROSILAZANE POLYMERS

CROSS-REFERENCE TO RELATED APPLICATION

This application is a continuation-in-part of copending application Ser. No. 147,183, filed Jan. 22, 1988 and now abandoned.

FIELD OF INVENTION

This invention relates to ceramic materials derived from polysilazanes and more particularly to such materials which are useful in protecting substrates that are normally susceptible to oxidative deterioration.

BACKGROUND

It is known that many materials, such as carbon/carbon composites, carbon fibers, graphite, and certain metals, have properties which make them attractive for use in aerospace and other applications in which their susceptibility to oxidative deterioration at elevated temperatures is a serious disadvantage. It would be desirable to find a means of protecting those materials from oxidation at high temperatures, and it has been proposed to provide such protection with ceramic coatings. However, known ceramic coatings have proved to be inadequate.

As disclosed in U.S. Pat. Nos. 4,397,828 (Seyferth et al.-I) 4,482,669 (Seyferth et al.-II), 4,645,807 (Seyferth et al.-III) 4,650,837 (Seyferth et al.-IV) and 4,659,850 (Arai et al.), it is known that ceramics can be obtained from polysilazanes. U.S. Pat. No. 4,482,689 (Haluska) discloses boron-containing metallosilazane polymers which are also useful in forming ceramic materials.

SUMMARY OF INVENTION

An object of this invention is to provide novel organoborosilazane polymers.

Another object is to provide such polymers which can be converted to ceramic coatings capable of protecting oxidizable substrates from oxidative deterioration at elevated temperatures.

These and other objects are attained by reacting about 0.25-20 parts by weight of a trialkyl- or trialkoxyboroxine in which the alkyl or alkoxy groups contain 1-6 carbons with one part by weight of a polysilazane to form an organoborosilazane polymer.

DETAILED DESCRIPTION

The polysilazane which is reacted with the boroxine may be any polysilazane that is soluble in common organic solvents, such as aliphatic or aromatic hydrocarbons, dialkyl or alicyclic ethers, etc.; and it may be, e.g., a polysilazane of Seyferth et al.-I, Seyferth et al.-II, Seyferth et al.-III, Seyferth et al.-IV, or Arai et al., the teachings of all of which are incorporated herein in toto by reference. However, it is preferably a polysilazane of the type taught by Seyferth et al.-II, i.e., a silazane polymer prepared by reacting an organodihalosilane with ammonia, treating the ammonolysis product with a basic catalyst which is capable of deprotonating an NH group that is adjacent to an SiH group, and quenching the resultant product with an electrophilic quenching reagent, a mixture of such polysilazanes, or, alternatively, an oligomeric ammonolysis product formed as an intermediate in the process of Seyferth et al.-II and isolated as in Seyferth et al.-I. For example, it may be one or more polysilazanes prepared by reacting methyldichlorosilane with ammonia, treating the ammonolysis product with potassium hydride, and quenching the resultant product with methyl iodide or dimethylchlorosilane; or it may be one or more polysilazanes prepared by reacting methyldichlorosilane with ammonia and isolating the ammonolysis product.

The boroxine reactant is a compound corresponding to the formula:

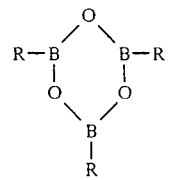

wherein R is an alkyl or alkoxy group containing 1-6 carbons, i.e., a $C_1$-$C_6$ trialkyl- or trialkoxyboroxine, such as the trimethoxy-, triethoxy-, tripropoxy-, tributoxy-, tripentoxy-, and trihexyloxyboroxines and the corresponding trialkylboroxines. It is preferably trimethoxyboroxine. The amount of boroxine employed is about 0.25-20, preferably about 1-6, and most preferably about 3-4 parts per part by weight of the polysilazane.

To prepare the polymers of the invention, the neat boroxine reactant (if sufficiently low melting) or a solution thereof in an organic solvent is added to a neat polysilazane (if a liquid) or to a solution of a polysilazane in an organic solvent to initiate an exothermic reaction which results in the formation of an organoborosilazane polymer. In a preferred embodiment of the invention in which the process is conducted so as to form a product solution that is directly utilizable as a coating or adhesive composition, the polysilazane is used as a clear solution having a solids content of about 10-40%, preferably about 20% by weight; and the total amount of solvent employed is such as to provide an organoborosilazane polymer solids content of about 5-75%, preferably about 40-60% by weight.

When a solvent is employed for the boroxine and/or polysilazane, it may be any suitable organic solvent, such as hexane, heptane, and other aliphatic hydrocarbons; benzene, toluene, xylene, and other aromatic hydrocarbons; cyclohexanone, 1-methyl2-pyrrolidone, and other ketones; etc.; and mixtures thereof. When it is desired to use a mixture of solvents for the reaction, the desired mixture may be introduced as the solvent for the polysilazane or for both the polysilazane and the boroxine, or different solvents may be used for the polysilazane and the boroxine.

The organoborosilazane polymers of the invention are preceramic materials which are useful for making ceramic fibers, filaments, flakes, powders, films, coatings, mats, woven fabrics, slabs, sleeves, structural composites, and other shaped articles; and, like other preceramic materials, they may be used in combination with other ingredients, such as lubricants or ceramic powders, fibers, or whiskers, etc., when appropriate.

An application in which they find particular utility is as coating compositions for normally oxidizable materials, especially those which need protection from oxidative deterioration at elevated temperatures. (Such materials include, e.g., fibers, tows, hanks, mats, and composites of carbon; carbon or graphite slabs, rods, and structures; and oxidizable metals, such as magnesium, aluminum, silicon, niobium, molybdenum, lanthanum, hafnium, tantalum, tungsten, and the metals of the lanthanide and actinide series.) When used in such an application in which the substrate is porous, the compositions can also serve as infiltrants when they are relatively dilute; and infiltration can be prevented or minimized by using more concentrated coating compositions.

In addition to providing protection from oxidative deterioration, the coating compositions can also serve to improve the physical properties and thermal stability of substrates, such as those mentioned above, silica foams, ceramic cloths (e.g., cloths formed from alumina, silica, and/or lithia), etc.

The coating compositions are also useful for patching ceramic coatings formed from the same or different formulations.

Another particularly notable utility of the compositions is as adhesive compositions which can be coated onto one or both of two surfaces to be adhered and then dried and pyrolyzed to form a ceramic bond.

When the compositions are to be used to provide protective ceramic coatings on substrates, the surfaces to be coated are usually cleaned prior to the application of the coating composition in order to improve the bonding of the ceramic coating to the substrate. The bonding can sometimes be further improved by pre-etching the surfaces to be coated.

As indicated above, coating compositions comprising the organoborosilazane polymers are generally solutions of about 5-75%, preferably about 40-60% by weight of the polymers in organic solvents, although they may be neat organoborosilazanes when the neat reaction products are fluids. These compositions may be applied to the substrates in any suitable manner, such as by spraying, swabbing, or brushing, to form coatings having the desired thickness, generally a thickness of up to about 1000 micrometers, frequently a thickness of about 10-250 micrometers. A coating of a desired thickness can be achieved by applying a single coating of that thickness or by applying the precursor polymer coating composition in multiple thinner layers. For example, when relatively thick coatings are desired, it is preferred to apply the coating composition in layers of about 25-100 micrometers, each layer being dried by driving off the solvent before the next layer is applied.

When temperatures as high as about 200°-250° C. are used to drive off high boiling solvents, some pyrolysis of the preceramic polymer is initiated during the drying of the coating composition. However, higher temperatures, i.e., about 675°-900° C., preferably about 825°-875° C., are required to convert the preceramic coating to a ceramic coating. This pyrolysis may be delayed until the final desired thickness of preceramic coating has been deposited, even when the coating is applied in multiple layers. However, when the coating is applied in multiple layers, it is generally preferred to pyrolyze each one or two layers of dried preceramic coating before applying the next layer of coating composition. The time required for the pyrolysis is generally about 1-60 minutes, depending on the particular pyrolysis temperature selected. In the preferred embodiment of the invention where the coating is applied in multiple layers, each one or two of which is pyrolyzed before the application of the next layer, and the pyrolysis temperature is about 825°-875° C., it is generally preferred to pyrolyze the first coat for only about five minutes and then to pyrolyze subsequent coats for longer times up to about 15 minutes.

After each pyrolysis step employed in providing a ceramic coating, the coated substrate is cooled. Optimum results are attained when this cooling is accomplished at a rate not greater than about 50° C./minute, preferably about 20°-30° C./minute, until the substrate temperature is below 500° C., at which time further cooling may be accomplished at ambient air temperature.

It is important to keep the starting polysilazane and the organoborosilazane polymers and compositions formed from them in an inert atmosphere until at least one layer of ceramic has been formed because of the susceptibility of the preceramic materials to attack by water and other compounds having active hydrogens. However, when the coating is provided by the application, drying, and pyrolysis of multiple layers, it is not essential to maintain an inert atmosphere after the first pyrolysis step.

As already indicated, the organoborosilazane polymers of the invention are useful in preparing a variety of ceramic objects, but the major advantage of the invention is its provision of compositions capable of protecting normally oxidizable materials from oxidative deterioration at elevated temperatures. This advantage is of particular importance in the protection of carbon/carbon composites, graphite, and metals used in aerospace applications, such as engine components, advanced nozzle system components, and high-temperature vehicle structures.

The following examples are given to illustrate the invention and are not intended as a limitation thereof.

EXAMPLE I

Synthesis of Polysilazane A

Part A

A suitable reaction vessel was charged with 14 L of anhydrous tetrahydrofuran and cooled to about 0° C., after which 1545 g (13.43 mols) of methyldichlorosilane was added to the vessel, and stirring at about 60 rpm was begun. A slow steady stream of 1058 g (62.12 mols) of anhydrous ammonia gas was introduced into the vessel at a flow rate such that the reaction pressure was maintained at or below 400 kPa, and the reaction temperature stayed in the range of 0°-10° C. Then the reaction mixture was stirred at 0° C. for about three hours, after which the coolant flow on the vessel was shut off, and the system was put under gentle nitrogen purge to allow the reaction mass to warm to room temperature and the majority of the excess ammonia to vent off. Then the reaction vessel was pressurized with sufficient nitrogen gas to pump the product mass through a bag filter assembly into a holding tank, where it was verified that the filtrate solution was free of particulates.

Part B

The clear filtrate from Part A was discharged into a polymerization vessel and chilled to about 0° C., and a suspension of 3.6 g (0.089 mol) of potassium hydride powder in about 100 mL of anhydrous tetrahydrofuran was added to begin the polymerization reaction. The reaction mixture was maintained at 0° C. for about 8 hours and then allowed to warm gradually to about 22° C. After a total of about 26 hours of polymerization at 0°-22° C., the reaction was quenched by adding about 12.6 g (0.13 mol) of dimethylchlorosilane to the polymerization solution.

The polymer product was isolated by (1) concentrating the product solution to about 4 L of volume by vacuum distillation, (2) centrifuging the concentrated solution to obtain a clear supernatant solution and a white precipitate, (3) decanting off the supernatant solution from the precipitate, and (4) flashing off the volatiles from the supernatant solution by vacuum distillation to provide a white solid. Proton NMR spectra of the polymer in deuterated chloroform solvent had resonances consistent with those reported in Seyferth et al.-II for polysilazane and with the presence of a small amount, i.e., 2.4% by weight, of residual tetrahydrofuran.

EXAMPLE II

Synthesis of Polysilazane B

Example I, Part A, was repeated to form an ammonolysis product, which was isolated by removing the solvent.

EXAMPLE III

Synthesis of Organoborosilazane Polymers

Part A

A clear solution of 4.0 g of trimethoxyboroxine in a mixture of 3.5 g of xylene and 0.5 g of 1-methyl-2-pyrrolidone was slowly added to a clear solution of 1.0 g of Polysilazane A in a mixture of 3.5 g of xylene and 0.5 g of 1-methyl-2-pyrrolidone. An exothermic reaction occurred to form a solution of an organoborosilazane polymer which was designated as OBSP-1.

Part B

Three other 20% solids polymer solutions were prepared by essentially repeating Part A except for altering the amounts of the reactants to provide trimethoxyboroxine/polysilazane weight ratios of 75/25, 50/50, and 25/75, respectively. The organoborosilazane polymer solutions obtained were designated as OBSP-2, OBSP-3, and OBSP-4, respectively.

Part C

Part A was essentially repeated except that the trimethoxyboroxine was replaced with tributylboroxine. The organoborosilazane polymer solution obtained was designated as OBSP-5.

Part D

An organoborosliazane polymer solution designated as OBSP-6 was prepared by adding 4.0 g of neat trimethoxyboroxine to a solution of 1.0 g of Polysilazane A in 4.0 g of xylene to generate a strong exothermic reaction which instantly resulted in the formation of a mobile gel.

Part E

An organoborosilazane polymer solution designated as OBSP-7 was prepared by (1) adding 4.0 g of neat trimethoxyboroxine to a solution of 1.0 g of Polysilazane A in a mixture of 3.0 g of 1-methyl-2-pyrrolidone and 1.0g of xylene to generate a mild exotherm and (2) stirring the resultant reaction mixture for at least 48 hours.

Part F

An organoborosilazane polymer designated as OBSP-8 was prepared by adding 8.0 g of neat trimethyoxyboroxine to 2.0 g of neat Polysilazane B to generate a very mild exothermic reaction which resulted in the formation of a white gelatinous precipitate.

EXAMPLE IV

Graphite coupons having nominal dimensions of about 3.8 cm×2.5 cm×0.3 cm were abraded to provided a smooth finish, cleaned, vacuum dried, thoroughly swab-coated in an inert atmosphere with the OBSP-2 solution, dried, heated at 100° C. for five minutes, heated to 150° C. at a rate of about 10° C./minute, held at 150° C. for 15-30 minutes, allowed to cool to room temperature, recoated and held at 150° C. for 30 minutes, heated to about 175°-186° C., maintained at that temperature for at least 15 minutes, and cooled to provide coupons having a coating thickness of about 0.08-0.1 mm.

The polymer coatings were then pyrolyzed to ceramic coats by heating the coated coupons to 165° C. at a rate of 5° C./minute, holding at 165° C. for 15 minutes, heating to 285° C. at a rate of 5° C./minute, holding at 285° C. for 30 minutes, heating to 385° C. at a rate of 10° C./minute, holding at 385° C. for 30 minutes, heating to 485° C. at a rate of 10° C./minute, holding at 485° C. for 15 minutes, heating to 725° C. at a rate of 10° C./minute, holding at 725° C. for 16 hours, and cooling to room temperature at a rate of 5°-10° C./minute.

The effectiveness of the ceramic coats thus obtained in protecting the graphite substrate from oxidation was determined by an oxidation test. The coated specimen was mounted horizontally in a half section of a silicon carbide tube which was used as a holder and which allowed over 99% of the coupon surface to be directly exposed to hot ambient convecting air. The holder and specimen were placed in a box furnace which had been preheated to 650° C. Periodically the holder and specimen were removed from the furnace and quenched in ambient air, the cooled specimen was weighed and remounted in its holder, and the holder and specimen were replaced in the heated furnace for additional heating in air. The results of the test are shown below.

| Time (hrs.) | % Weight Loss on Oxidation |
| --- | --- |
| 4 | 0.2 |
| 8 | 0.3 |
| 24 | 0.5 |

These weight losses compare with (A) weight losses of 14-15%, 36-38%, and 100% at 4 hours, 8 hours, and 24 hours, respectively, when uncoated graphite coupons were subjected to the same oxidation test, (B) weight losses of 6.5-9.1%, 18-27%, and 89-100% at 4 hours, 8 hours, and 24 hours, respectively, when the graphite coupons were coated with a ceramic derived from a 20% solids solution of the polysilazane alone, and (C) weight losses of 0.7-0.8%, 2.7-4.0%, and 18-25% at 4 hours, 8 hours, and 24 hours, respectively, when the graphite coupons were coated with a ceramic derived from a 20% solids solution of the trimethoxyboroxine alone.

EXAMPLE V

Example IV was essentially repeated except that the preceramic solutions used to coat the coupons were OBSP-3 and OBSP-4. The results of the oxidation test are shown below.

| | % Weight Loss on Oxidation | |
|---|---|---|
| Time (hrs.) | OBSP-3 | OBSP-4 |
| 4 | 0.2 | 3 |
| 8 | 0.4 | 10 |
| 24 | 2.2 | 62 |

EXAMPLE VI

Example IV was essentially repeated except that OBSP-8 was substituted for OBSP-2 After 24 hours at 650° C., the oxidation weight loss of the coated graphite coupons was 2.9–6.4%.

EXAMPLE VII

Example IV was essentially repeated except that OBSP-6 was substituted for OBSP-2 and the ultimate coating thickness of about 0.08–0.1 mm was achieved by applying the coating composition in multiple layers, each of which was heated at 80°–110° C. until the surface appeared dry, then heated at 125°–135° C. and subsequently at 220°–225° C. to remove the solvent, next heated at a rate of 20°–30° C./minute and then to room temperature at ambient air temperature before the next layer was applied. The first layer was heated at the pyrolysis temperature for only 5 minutes; the other layers were held at the pyrolysis temperature for 5–15 minutes. After 24 hours at 650° C., the oxidation weight loss of the coated graphite coupons was 0.07–0.8%.

EXAMPLE VIII

Example VII was essentially repeated except that OBSP-7 was substituted for OBSP-6. After 24 hours at 650° C., the oxidation weight loss of the coated graphite coupons was 1.0–1.8%.

COMPARATIVE EXAMPLE

Example IV was essentially repeated except that the preceramic solutions used to coat the coupons were 20% solids solutions of 50/50 mixtures of Polysilazane A and, respectively, (A) trimethyl borate, (B) triisopropyl borate, (C) tri-n-butyl borate, and (D) tribenzyl borate. The results of the oxidation test are shown below.

| | % Weight Loss on Oxidation | | | |
|---|---|---|---|---|
| Time (hrs.) | A | B | C | D |
| 4–5 | 16 | 20 | 41 | 32 |
| 8–9 | 34 | 63 | 67 | 56 |
| 24 | 94 | 97 | 97 | 97 |

EXAMPLE IX

Example IV was essentially repeated except that the coupons that were coated with the OBSP-2 solution were uninhibited carbon/carbon composite coupons having nominal dimensions of about 2.5 cm×2.5 cm×0.3 cm which were cleaned, abraded, cleaned again, etched with nitric and hydrofluoric acids, recleaned, and dried before being coated. The results of the oxidation test are shown below.

| Time (hrs.) | % Weight Loss on Oxidation |
|---|---|
| 4 | 0.3 |
| 8 | 0.5 |
| 24 | 10 |

These weight losses compare with (A) weight losses of 16–19%, 31–36%, and 52–78% at 4 hours, 8 hours, and 24 hours, respectively, when uncoated carbon/carbon coupons were subjected to the same oxidation test, (B) weight losses of 6.5%, 13% and at 4 hours, 8 hours, and 24 hours, respectively, when the carbon/carbon coupons were coated with a ceramic derived from a solids solution of the polysilazane alone, and (C) weight losses of 2.3–2.7%, 9.5–10%, and 55–58% at 4 hours, 8 hours, and 24 hours, respectively, when the carbon/carbon coupons were coated with a ceramic derived from a 20% solids solution of the trimethoxyboroxine alone.

EXAMPLE X

Example IX was essentially repeated except that the preceramic solutions used to coat the coupons were OBSP-1, OBSP-3, OBSP-4, and OBSP-5. The results of the oxidation test are shown below.

| | % Weight Loss on Oxidation | | | |
|---|---|---|---|---|
| Time (hrs.) | OBSP-1 | OBSP-3 | OBSP-4 | OBSP-5 |
| 4 | 0.35 | 3.7 | 4.0 | 1.5 |
| 8 | 0.9 | 8.1 | 10 | 3.8 |
| 24 | 11 | 34 | 42 | 38 |

EXAMPLE XI

Example IV was essentially repeated except that the coupons that were coated with the OBSP-2 solution were inhibited carbon/carbon composite coupons (i.e., carbon/carbon composite coupons containing an oxidation inhibitor) having nominal dimensions of about 2.5 cm×2.5 cm×0.34 cm which were pretreated as in Example IX before being coated. The results of the oxidation test are shown below.

| Time (hrs.) | % Weight Loss on Oxidation |
|---|---|
| 4 | 0.2 |
| 8 | 0.3 |
| 24 | 1.0 |

These weight losses compare with (A) weight losses of 1.6–1.8%, 4.5–5.7%, and 15–17% at 4 hours, 8 hours, and 24 hours, respectively, when uncoated inhibited carbon/carbon coupons were subjected to the same oxidation test, (B) weight losses of 1.2%, 2.2%, and 10% at 4 hours, 8 hours, and 24 hours, respectively, when the inhibited carbon/carbon coupons were coated with a ceramic derived from a 20% solids solution of the polysilazane alone, and (C) weight losses of 0.8%, 1.8%, and 4.6% at 4 hours, 8 hours, and 24 hours, respectively, when the inhibited carbon/carbon coupons were coated with a ceramic derived from a 20% solids solution of the trimethoxyboroxine alone.

EXAMPLE XII

Example XI was essentially repeated except that the preceramic solutions used to coat the coupons were OBSP-1, OBSP-3, OBSP-4, and OBSP-5. The results of the oxidation test are shown below.

| Time (hrs.) | % Weight Loss on Oxidation | | | |
|---|---|---|---|---|
| | OBSP-1 | OBSP-3 | OBSP-4 | OBSP-5 |
| 4 | 0.09 | 0.7 | 1.0 | 0.5 |
| 8 | 0.17 | 0.8 | 1.8 | 1.5 |
| 24 | 0.3 | 1.6 | 6.8 | 6.5 |

EXAMPLE XIII

Example XII was essentially repeated in the preparation of coated inhibited carbon/carbon composite coupons from the OBSP-1 solution except that the amount of coating applied to the coupons was such as to provide a coating thickness of only about 0.01-0.03 mm. The results of the oxidation test are shown below.

| Time (hrs.) | % Weight Loss on Oxidation |
|---|---|
| 8 | 0.3 |
| 24 | 1.1 |

EXAMPLE XIV

Example XI was essentially repeated except that OBSP-6 was substituted for OBSP-2, and the coating composition was applied, dried, and pyrolyzed as in Example VII. After 24 hours at 650° C., the oxidation weight loss of the coated coupons was 0.05-0.4%.

EXAMPLE XV

Example XIV was essentially repeated except that OBSP-7 was substituted for OBSP-6. After 24 hours at 650° C., the oxidation weight loss of the coated coupons was 0.8-1.6%.

It is obvious that many variations can be made in the products and processes set forth above without departing from the spirit and scope of this invention.

What is claimed is:

1. A process which comprises reacting about 0.25-20 parts by weight of a trialkylboroxine or trialkoxyboroxine in which the alkyl or alkoxy groups contain 1-6 carbons with one part by weight of a polysilazane to form an organoborosilazane polymer.

2. The process of claim 1 wherein the boroxine is a trialkoxyboroxine.

3. The process of claim 2 wherein the boroxine is trimethoxyboroxine.

4. The process of claim 1 wherein the polysilazane is a polymer prepared by reacting an organodihalosilane with ammonia to form an ammonolysis product, treating the ammonolysis product with a basic catalyst which is capable of deprotonating an NH group that is adjacent to an SiH group to form said polysilazane, and quenching the resultant polysilazane with an electrophilic quenching reagent.

5. The process of claim 4 wherein the organodihalosilane is methyldichlorosilane, the basic catalyst is potassium hydride, and the quenching reagent is dimethylchlorosilane.

6. The process of claim 1 wherein the polysilazane is a product prepared by reacting an organodihalosilane with ammonia and isolating the resultant ammonolysis product.

7. The process of claim 6 wherein the organodihalosilane is methyldichlorosilane.

8. The process of claim 1 wherein the boroxine/polysilazane weight ratio is about 1/1 to about 6/1.

9. The process of claim 8 wherein the boroxine/polysilazane weight ratio is about 3/1 to about 4/1.

10. The process of claim 1 wherein the reactants are mixed and reacted by adding a solution of the boroxine to a solution of the polysilazane.

11. The process of claim 1 wherein about 3-4 parts by weight of trimethoxyboroxine are mixed and allowed to react with one part by weight of a polysilazane prepared by reacting methyldichlorosilane with ammonia, treating the ammonolysis product with potassium hydride, and quenching the resultant product with dimethylchlorosilane.

12. An organoborosilazane polymer prepared by the process of claim 1.

13. An organoborosilazane polymer prepared by the process of claim 2.

14. An organoborosilazane polymer prepared by the process of claim 3.

15. An organoborosilazane polymer prepared by the process of claim 4.

16. An organoborosilazane polymer prepared by the process of claim 5.

17. An organoborosilazane polymer prepared by the process of claim 6.

18. An organoborosilazane polymer prepared by the process of claim 7.

19. An organoborosilazane polymer prepared by the process of claim 8.

20. An organoborosilazane polymer prepared by the process of claim 9.

21. An organoborosilazane polymer prepared by the process of claim 10.

22. An organoborosilazane polymer prepared by the process of claim 11.

23. A composition which comprises a solution of 5-75% by weight of an organoborosilazane polymer in 95-25% by weight of an organic solvent; the polymer being the product obtained by reacting about 0.25-20 parts by weight of a trialkylboroxine or trialkoxyboroxine in which the alkyl or alkoxy groups contain 1-6 carbons with one part by weight of a polysilazane.

24. The composition of claim 23 which comprises a solution of 40-60% by weight of an organoborosilazane polymer in 60-40% by weight of an organic solvent; the polymer being the product obtained by reacting about 1-6 parts by weight of a trialkoxyboroxine with one part by weight of a polysilazane.

25. The composition of claim 24 wherein the polymer is the product obtained by reacting about 3-4 parts by weight of the trialkoxyboroxine with one part by weight of the polysilazane.

26. The composition of claim 25 wherein the trialkoxyboroxine is trimethoxyboroxine.

27. The composition of claim 25 wherein the polysilazane is a polymer prepared by reacting an organodihalosilane with ammonia to form an ammonolysis product, treating the ammonolysis product with a basic catalyst which is capable of deprotonating an NH group that is adjacent to an SiH group to form said polysilazane, and quenching the resultant polysilazane with an electrophilic quenching reagent.

28. The composition of claim 27 wherein the organodihalosilane is methyldichlorosilane, the basic catalyst is potassium hydride, and the quenching reagent is dimethylchlorosilane.

29. An article which comprises a substrate that is normally susceptible to oxidative deterioration and a coating derived from the composition of claim 23.

30. A ceramic derived from the organoborosilazane of claim 12.

* * * * *